United States Patent

Mayle

[15] 3,643,167

[45] Feb. 15, 1972

[54] AUTOMATIC TURNOFF SYSTEM FOR RECEIVER WITH FM DEMODULATOR

[72] Inventor: Louis F. Mayle, Fort Wayne, Ind.

[73] Assignee: The Magnavox Company, Fort Wayne, Ind.

[22] Filed: Feb. 24, 1969

[21] Appl. No.: 801,348

[52] U.S. Cl. ....................325/389, 178/6, 325/364

[51] Int. Cl. ....................H04b 1/06

[58] Field of Search....................325/390, 391, 392, 393, 395, 325/389, 364, 362, 396, 409, 348, 402, 478, 55, 57, 64, 403, 492; 178/5, 8, 6, DIG. 15; 334/8, 9, 10

[56] References Cited

UNITED STATES PATENTS

| | | | |
|---|---|---|---|
| 2,559,959 | 7/1951 | Hipps | 325/389 |
| 3,378,775 | 4/1968 | Joseph | 325/393 X |
| 2,923,862 | 2/1960 | Teich | 178/DIG. 15 |
| 3,418,577 | 12/1968 | Fischer | 325/392 X |
| 3,541,453 | 11/1970 | Vanderpoel et al | 325/393 X |

*Primary Examiner*—Richard Murray
*Attorney*—Richard T. Seeger

[57] ABSTRACT

The present invention concerns an automatic system for turning off a television receiver when there is no signal on the channel to which the television set is tuned. According to the present invention, the automatic circuitry is sensitive to a DC voltage change which occurs in the FM sound demodulator of the receiver so that the receiver can be used on channels having picture and sound, as well as on a channel having only sound.

10 Claims, 3 Drawing Figures

INVENTOR.
LOUIS F. MAYLE
BY
JEFFERS & YOUNG
Attorneys

AUTOMATIC TURNOFF SYSTEM FOR RECEIVER WITH FM DEMODULATOR

The present invention relates to signal receivers, particularly television sets and the like and is especially concerned with the control of such a signal receiver in response to the received signal.

Television sets are known in which the receiver automatically turns off within a short period of time, say, one or two minutes, after the station or channel to which it is tuned terminates its broadcasting. Such systems generally sense the horizontal synchronizing or blanking signal and initiate the turning off operation when the signal is interrupted.

For television sets receiving a regular television signal (picture and sound) or a television signal with picture only (no sound RF carrier) the system works satisfactorily. But when receiving a sound, only, signal (no video, blanking or sync signals), such as may be found on CATV cable systems, the television receiver will shut off. The particular condition introduced by a CATV cable system which is not encountered with a local or individual antenna is that the cable systems usually have one or more music channels which carry no picture and which therefore have no horizontal synchronizing signal which can be sensed. Thus, when a television set with a conventional automatic shutoff system is connected to a CATV cable and is tuned to a music channel, the receiver will automatically shut off.

With the foregoing in mind, it is a primary objective of the present invention to provide a system for a television receiver for sensing an incoming signal whether or not the signal has a picture, and providing for automatically turning the set off if no signal is being supplied to the set.

A further object of the present invention is the provision of a relatively simple sensing system which controls automatic turn off circuitry of a television receiver in such a manner that the set will not be turned off as long as there is a signal supplied thereto whether or not the signal embodies a picture signal.

A still further object of this invention is the provision of circuitry of the nature referred to which involves the minimum in modification of existing circuitry and the minimum in cost.

The foregoing objects as well as still other objects and advantages of the present invention will become more apparent upon reference to the following detailed description taken in connection with the accompanying drawings in which.

SUMMARY OF THE INVENTION

The present invention proposes the provision of an automatic turnoff system for a television receiver which, in contrast to previously known systems which sense the presence in the television circuit of a signal derived from the signal taken from the picture carrier, senses a signal derived from the 4.5 mc. sound carrier so that any time sound is being developed by the set, the automatic turn off will remain idle. The advantage of the arrangement of the present invention is that a television set connected to a CATV cable can receive sound channels as well as television channels.

In one form of the invention, the invention senses a voltage developed across a resistor pertaining to the sound demodulator and keeps the automatic turn off idle as long as such a voltage is present.

DETAILED DESCRIPTION

Figures 1, 3:
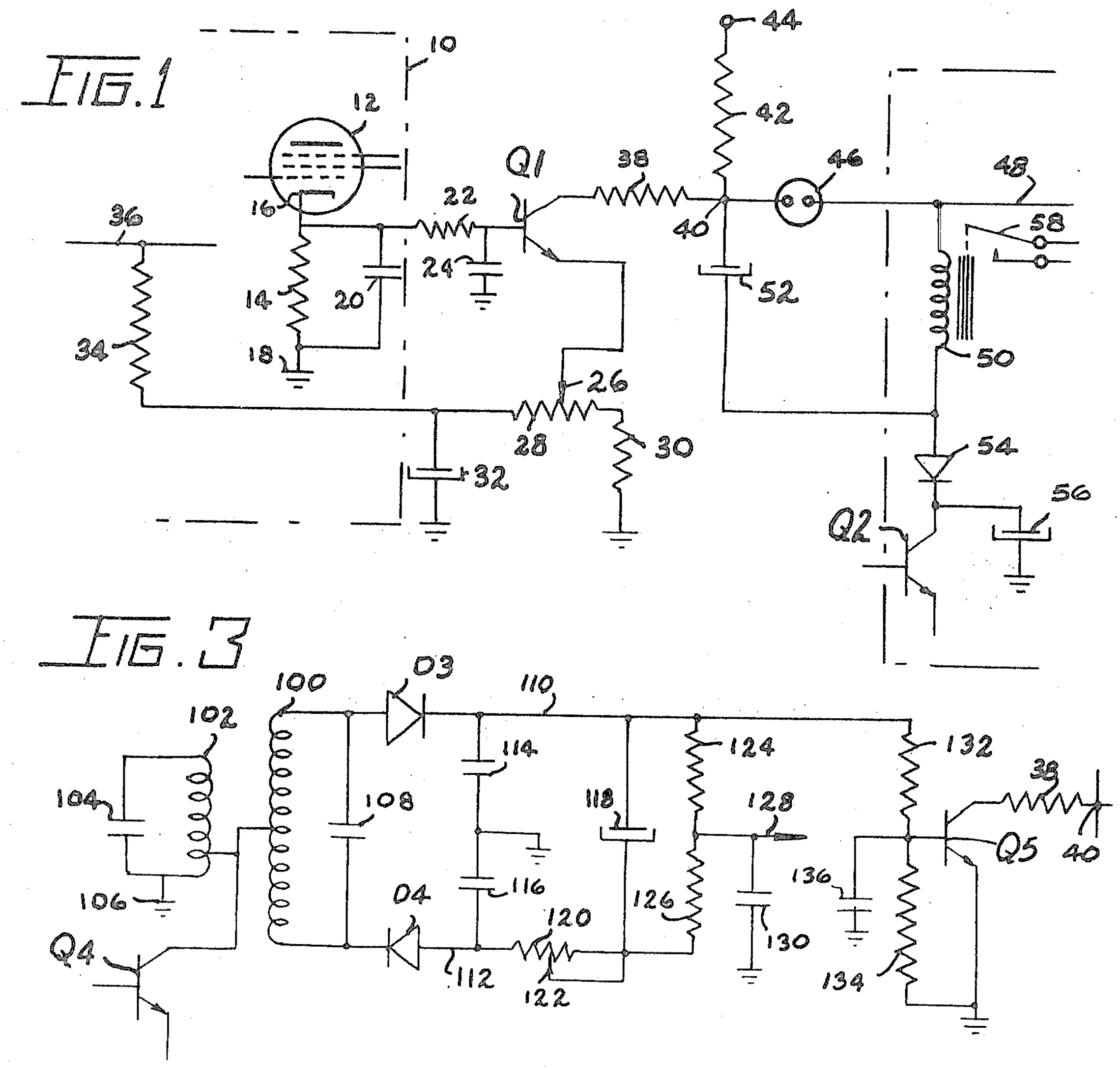
FIG. 1 is a schematic view showing a portion of a television receiver circuit and, in particular, the sound demodulator and the circuit for actuating a stepping relay which will turn the receiver off and the connection therebetween.
FIG. 3 is a view like FIG. 2 but showing a ratio detector of the type to be employed with a color television receiver.

Referring to FIG. 1, reference numeral 10 indicates a television receiver having a sound demodulator tube 12. The sound demodulator tube has a cathode resistor 14 between the cathode 16 and ground 18 and bypassed by a capacitor 20. The cathode is also connected through a resistor 22 to the base of a transistor Q1 with the said base also being bypassed to ground via a capacitor 24. The emitter of transistor Q1 connected with the adjustable tap 26 of a potentiometer 28 which at one end is connected via resistor 30 with ground and at the other end is bypassed through an electrolytic capacitor 32 to ground. The said other end of the potentiometer 28 is also connected with one end of a voltage divider resistor 34 which has its other end connected to a plus 140-volt source represented by wire 36.

The collector of transistor Q1 is connected through a resistor 38 with a point 40 which point is connected through a resistor 42 with a plus 205-volt source at 44. Point 40 is also connected through a neon tube 46 with a plus 15 volt source represented by wire 48. Wire 48 is connected with one end of a relay coil 50 having its other end connected through electrolytic capacitor 52 with point 40. The end of coil 50 connected to capacitor 52 is also connected to the anode side of a diode 54, the negative side of which is connected to the collector of a transistor Q2 and also to ground via an electrolytic capacitor 56.

The elements Q2, 54 and 56 pertain to a remote control arrangement for operating coil 50 and are not completely shown because the remote control arrangement per se forms no part of the present invention. The present invention is more particularly concerned with the control of the charging of capacitor 52 which, when permitted to charge to a predetermined level, will discharge across neon tube 46 and through coil 50 thus energizing the coil to actuate its blade 58. Actuation of the movable contact or blade 58 results in turning the setoff.

In operation, whenever a signal is being received by the television set, whether with or without a picture signal, a voltage is developed across cathode resistor 14 which will bias the base of transistor Q1 to cause the transistor to conduct thereby preventing the charging of capacitor 52. When no signal is being received by the set, the voltage across cathode resistor 14 drops so that transistor Q1 ceases to conduct whereupon capacitor 52 will commence to charge from source 44 and will gradually build up in voltage until neon tube 46 conducts, whereupon coil 50 will be energized to actuate its blade 58 and turn the setoff.

It will be appreciated that the signal which controls the shut off circuit is not associated with the video portion of the television set but, rather, with the audio portion so that the automatic shut off is prevented from operating even when a music channel having no picture is being received by the television set.

Figure 2:
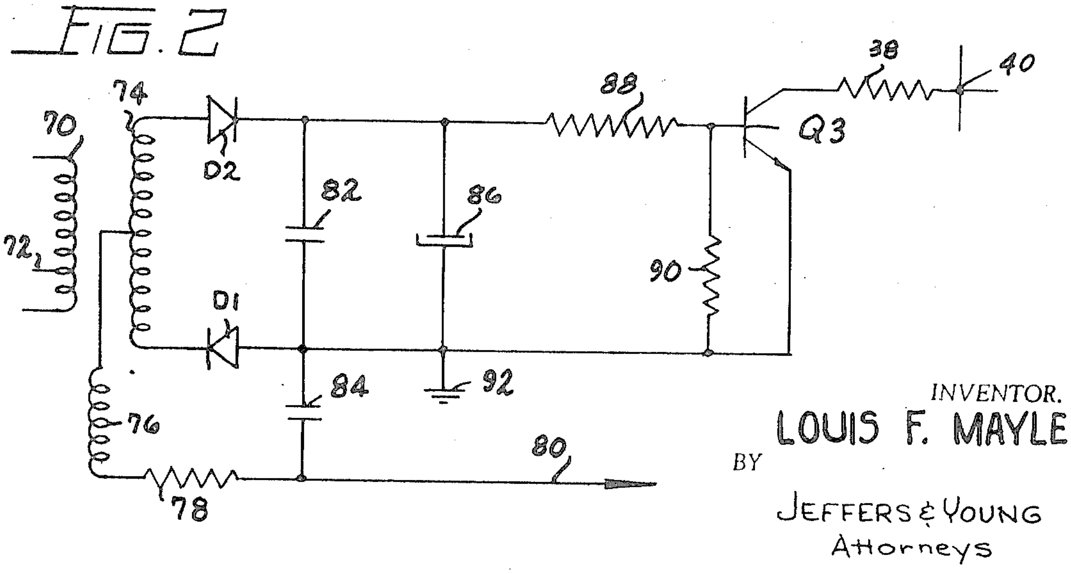
FIG. 2 is a fragmentary circuit showing an unbalanced ratio detector as employed in the audio demodulator circuit of a monochrome television receiver and the manner in which it is connected to the automatic turnoff circuit.

In FIG. 2, there is shown an unbalanced ratio detector of the type that could be employed in a television receiver. In FIG. 2, input coil 70 has a tap at 72. Coil 70 is coupled with coils 74 and 76. One end of coil 76 is connected to the center of coil 74 and the other end is connected through a resistor 78 to wire 80 which carries the audio output.

One end of coil 74 is connected to the cathode of a diode D1 and the other end is connected to the anode of a diode D2. The cathode side of diode D2 is connected through capacitor 82 with the anode of diode D1 which, in turn, is connected to ground 92. Capacitor 82 is connected in parallel with electrolytic condenser 86 and in parallel with condenser 86 is a series branch made up of resistor 88 and the base-emitter path of transistor Q3. A resistor 90 connected between the base and emitter of transistor Q3 keeps the base at ground potential when no, or a very small DC voltage, is developed across electrolytic capacitor 86. The wire leading from the emitter of transistor Q3 is also grounded at 92.

The collector of transistor Q3 is connected to one end of resistor 38 which leads to point 40 which has been referred to in connection with FIG. 1.

When an FM signal is being demodulated, a DC voltage is developed across electrolytic capacitor 86 resulting in a flow of current through resistor 88 and base-emitter of transistor Q3, causing it to become conductive, thus preventing from charging the electrolytic capacitor indicated at 52 in FIG. 1 associated with the automatic shut off circuit. In the absence of a 4.5 MHz. IF signal to the ratio detector, no or very little, voltage will be developed across the electrolytic capacitor 86. Assuming a small DC voltage developed across electrolytic capacitor 86, due to noise, a small current will flow through resistor 88 which would divide between resistor 90 and the base-emitter of transistor Q3 if the IR drop across resistor 90 were greater than the offset voltage of the base-emitter diode of transistor Q3. But the IR drop across resistor 90 should be less than the offset voltage so that all the current through resistor 88 will flow through resistor 90, and none through the base-emitter path of transistor Q3. Therefore Q3 will be rendered nonconductive and capacitor 52 will charge leading to turning off of the TV receiver.

FIG. 3 shows a system similar to that of FIG. 2, but is a balanced ratio detector with provision for balancing out amplitude modulation. In FIG. 3, the collector of a transistor Q4 is connected to the center of a coil 100 and to a point displaced from the center of a coil 102 which is coupled to coil 100. Coil 102 is in closed circuit with a capacitor 104 and has one end grounded at 106.

A capacitor 108 is connected across the terminals of coil 100. One end of coil 100 is connected to the anode side of a diode D3 and the other end is connected to the cathode side of diode D4. The cathode side of diode D3 is connected to a wire 110 and the anode side of diode D4 is connected to a wire 112. Connected between wires 110 and 112 are serially arranged capacitors 114 and 116 with the juncture thereof grounded. Also connected between wires 110 and 112 is an electrolytic condenser 118. Wire 112, between its connection to capacitor 116 and electrolytic condenser 118, embodies a resistor 120 having an adjustable tap 122 on the end toward electrolytic condenser 118. Connected in parallel with electrolytic condenser 118 are the serially arranged resistors 124 and 126 with the juncture thereof connected to wire 128 from which the audio output of the circuit is taken. Wire 128 is bypassed to ground via a small capacitor 130 for audio deemphasis.

Connected between wire 110 and ground is serially connected resistors 132 and 134 with the juncture thereof connected to the base of a transistor Q5 and also bypassed to ground through capacitor 136. The emitter of transistor Q5 is grounded and the collector is connected to the end of resistor 38 opposite point 40.

When an FM sound carrier is being received, a positive voltage, with respect to ground, will be developed on wire 110. As in the case for FIG. 2, the resulting current flowing in resistor 132 will make transistor Q5 conductive and prevent charging of electrolytic capacitor 52. When, however, no FM sound carrier is being received, transistor Q5 becomes nonconductive and capacitor 52 will charge and result in actuating the blade 58 pertaining to relay coil 50.

In each of the described circuits, an arrangement is provided for the automatic turning off of a television set, and which means is independent of the video signal and is sensitive only to the FM sound carrier so that the turning off of the set will occur only in the absence of an audio signal. The associated television receiver can thus be employed on music channels as well as on channels providing a picture without the set automatically turning off in the absence of a video signal. It will be understood that it is intended to include modifications and adaptations of the invention falling within the scope of the appended claims.

What is claimed is:

1. In an electromagnetic wave receiver; a relay having an actuating coil and operable when the coil is energized to turn the receiver off, and means responsive to the absence of an intermediate frequency FM sound carrier in the receiver for energizing the said coil of said relay, said means comprising a capacitor in circuit with said coil and adapted when charged to a predetermined potential to discharge through said coil and thereby energize said coil, first means connected to said capacitor to supply a charge thereto, and second means for diverting the charge from said capacitor only when an intermediate frequency FM sound carrier is present.

2. In a receiver according to claim 1 in which said capacitor is an electrolytic capacitor, said first means is a source of direct current and a resistor connecting the source to one side of said capacitor, and said second means comprises a transistor having its collector-emitter path connected between the said one side of said capacitor and a point to which said source will drain, said transistor having its base connected to a predetermined point in the audio channel of said receiver, said transistor base-emitter voltage biasing said transistor to conduction when an intermediate frequency FM sound carrier signal is present and to nonconduction when no intermediate frequency FM signal carrier is present.

3. In a receiver according to claim 2 in which said audio channel includes demodulator means having a point which is at one potential when an audio signal is present and at another potential when an intermediate frequency FM signal is absent, said point in said demodulator means being the said predetermined point which is connected to said base of said transistor.

4. In a receiver according to claim 3 in which said demodulator means comprises a demodulator tube having a cathode resistor connected between the cathode of the tube and ground, said predetermined point being the cathode end of said cathode resistor.

5. In a receiver according to claim 4 in which said transistor is an NPN transistor and has its collector connected to said one side of said electrolytic capacitor and resistance means connecting the emitter of said transistor to ground.

6. In a receiver according to claim 5 in which said resistance means comprises a resistor element connected between a direct current source and ground and having an adjustable tap connected to said emitter.

7. In a receiver according to claim 6 which includes a second electrolytic capacitor connected between ground and the end of said resistor element opposite ground.

8. In a receiver according to claim 7 which includes a second resistor element connected between the cathode end of said cathode resistor and the base of said transistor, and a capacitor connected between said base and ground.

9. In a receiver according to claim 3 in which said transistor is an NPN transistor and said demodulator means comprises a ratio detector circuit having a coil, a first diode having its anode connected to one end of said coil and its cathode to the base of said transistor, and a second diode having its cathode connected to the other end of said coil and its anode connected to the emitter of said transistor, the collector of said transistor being connected to said one side of said electrolytic capacitor.

10. In a receiver according to claim 3 in which said transistor is an NPN transistor and said demodulator means comprises a ratio detector circuit having a coil, a first diode having its anode connected to one end of said coil and a second diode having its cathode connected to the other end of said coil, a pair of serially connected capacitors connecting the cathode of the first diode with the anode of the second diode and the juncture of said capacitors being grounded, a pair of serially arranged resistors arranged in parallel with said capacitors with the juncture thereof forming the audio output connection, a second pair of serially arranged resistors connected between the cathode of said first diode and ground, and the juncture thereof being connected to the base of said transistor, the emitter of said transistor being connected to ground.

* * * * *